Figure 1:
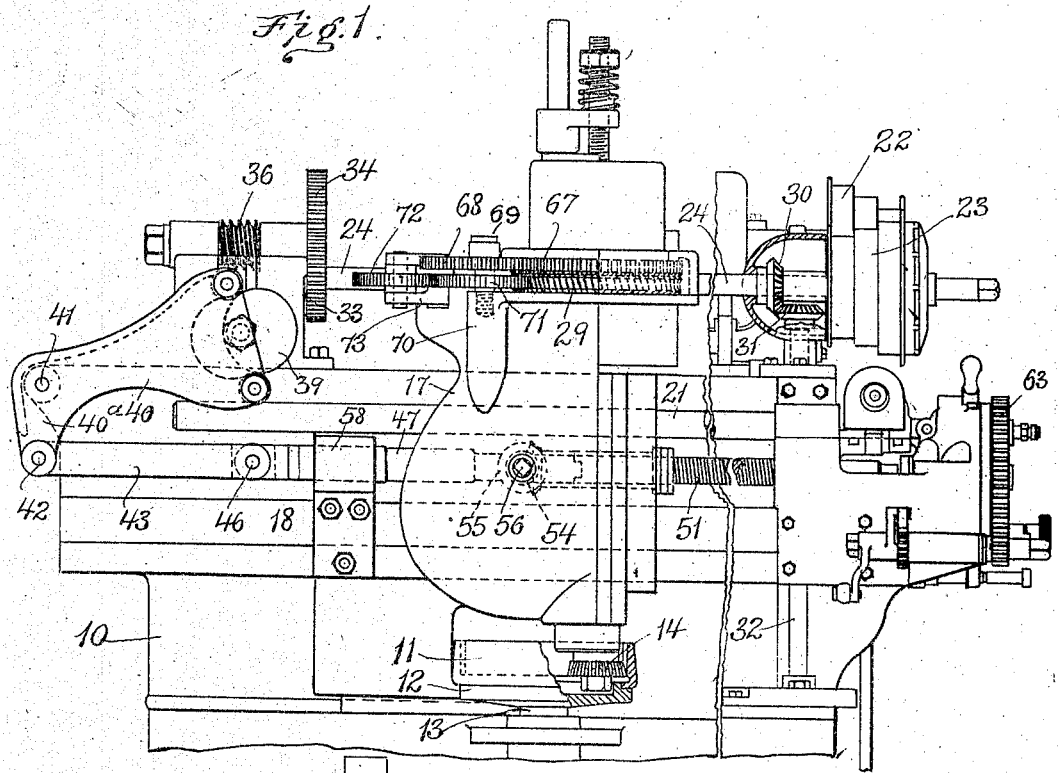

E. R. FELLOWS.
MACHINE FOR GENERATING AND CUTTING IRREGULAR GEARS.
APPLICATION FILED MAR. 11, 1914.

1,177,503.

Patented Mar. 28, 1916.
4 SHEETS—SHEET 1.

Witnesses:

Inventor
E. R. Fellows

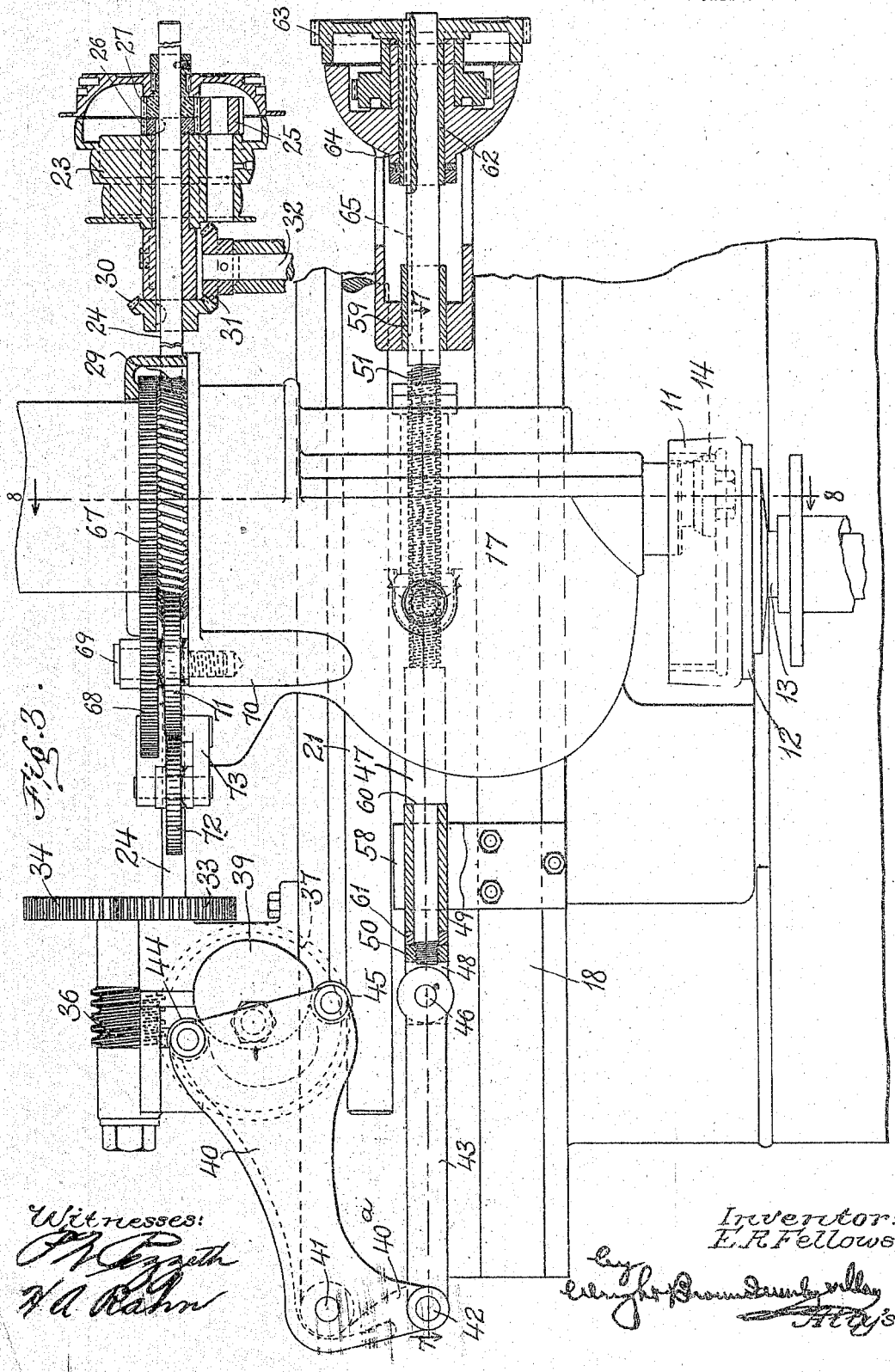

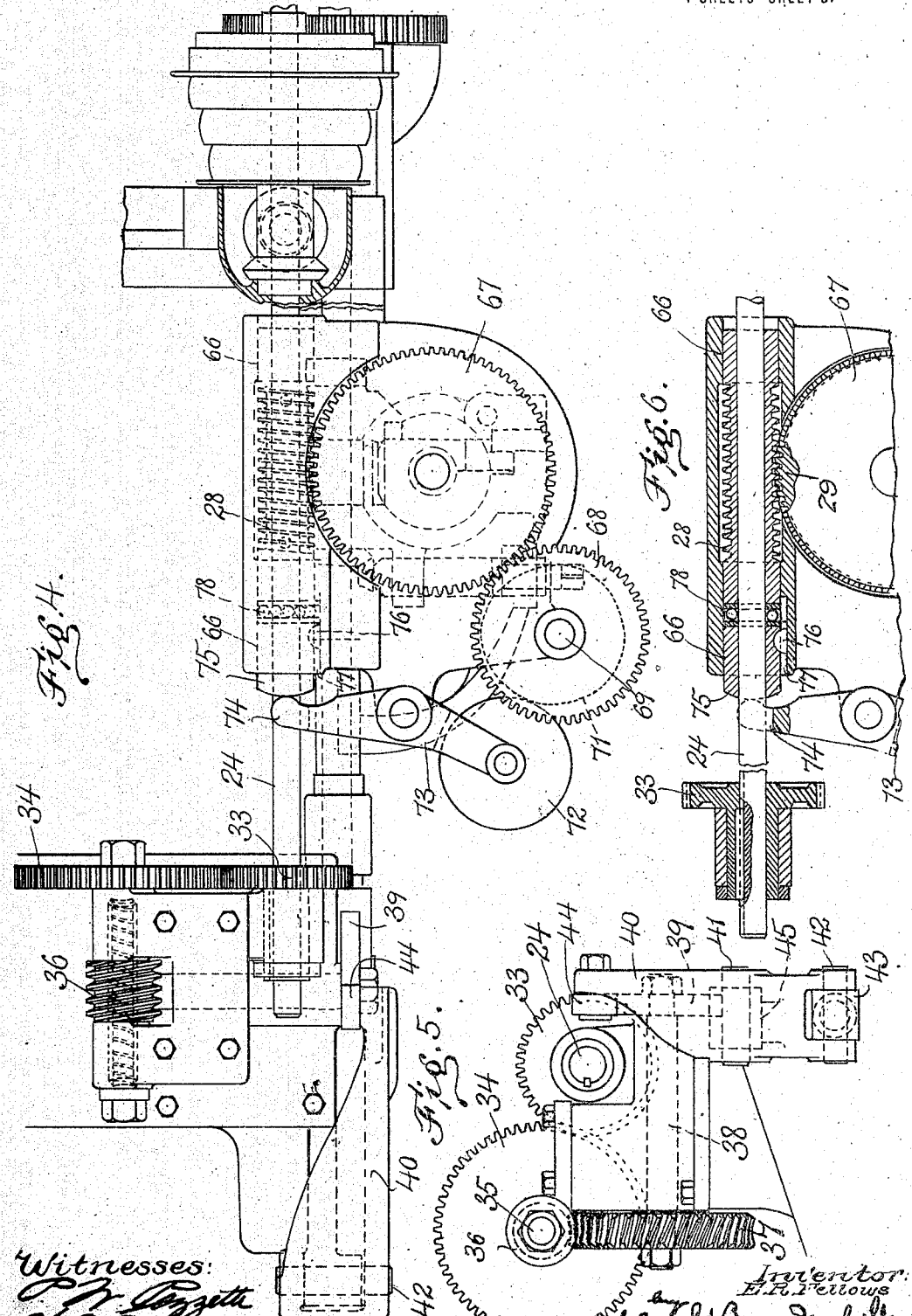

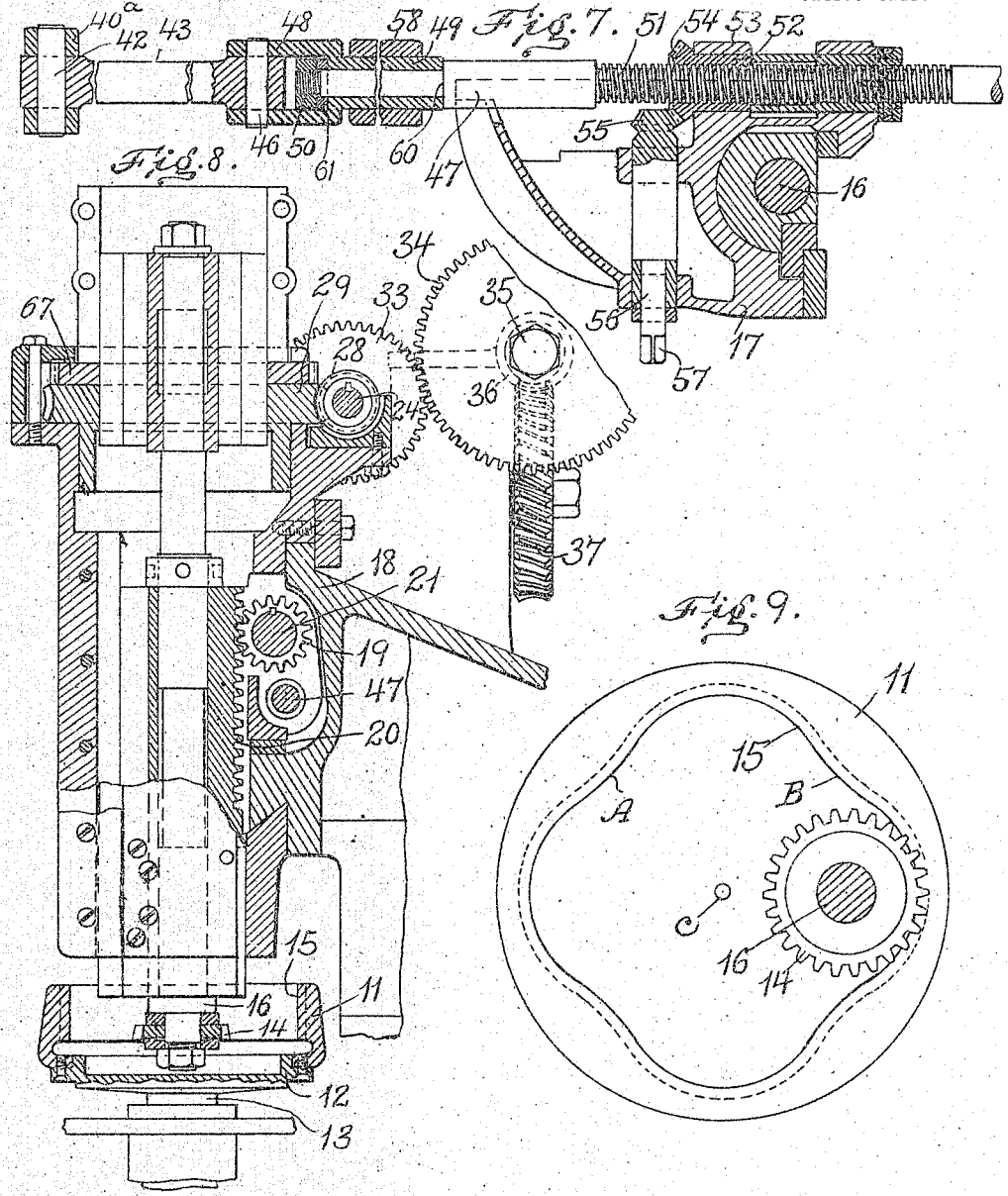

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

MACHINE FOR GENERATING AND CUTTING IRREGULAR GEARS.

1,177,503.  Specification of Letters Patent.  Patented Mar. 28, 1916.

Application filed March 11, 1914. Serial No. 824,028.

*To all whom it may concern:*

Be it known that I, EDWIN R. FELLOWS, a citizen of the United States, and resident of Springfield, in the county of Windsor and State of Vermont, have invented certain new and useful Improvements in Machines for Generating and Cutting Irregular Gears, of which the following is a specification.

This invention relates to a machine for generating gears on the principle explained in prior patents granted to me March 30, 1897, No. 579,708; June 11, 1901, No. 676,227; and June 4, 1912, No. 1,028,343, in which a planing cutter shaped like a gear and having peripheral projections similar in form to gear teeth is carried past the edge of a gear blank, and is rotated simultaneously with the blank, to cut the teeth in the blank and at the same time generate the curves of such teeth to mesh properly with any gear having teeth of the same pitch, shape and size as the projections of the cutter. The machines described in said patents and the method according to which such machines are worked result in producing regular gears, that is, gears in which the teeth are all equi-distant from the center.

The present invention has for its object to produce an improvement in or addition to a machine of the general character indicated by which a gear-shaped planing cutter of regular form may be used to generate the teeth of an irregular gear, that is, a gear of which the teeth are not arranged concentrically about the axis of the gear.

Gearing has been designed consisting of a couple or pair, one of which is a pinion of regular form having equally spaced teeth all exactly alike and all equally distant from the center, and the other of which is a gear having its line of teeth eccentric to the center of the gear in various forms and degrees. Ordinarily such irregular gears have two or more lobes which are symmetrically arranged and are similar to one another. In the operation of such a geared couple, one of the members, generally the pinion, is required to move in and out with respect to the axis of the other member. Such an irregular gear of course can not be produced by the methods and machines heretofore employed in which the cutter and the work are rotated about fixed axes.

The problem solved by the present invention has been to provide means adapted for use in connection with a gear generating machine operating on the general principles described in the patents above cited, by which the relative positions of the cutter and of the blank being cut may be altered during the progress of the generating and cutting operation in a manner similar to that in which the pinion and the irregular gear of the geared couple are shifted relatively to one another during the operation of such geared couple; and also to effect variations in the rate of rotating the cutter to compensate for the variation in distance of different teeth of the irregular gear from the axis of the gear, so that the teeth generated may be spaced on the pitch line equally to the spacing of the projections or teeth of the cutter.

In the present application I have illustrated the embodiment of my invention in means adapted to be applied to what I term my standard machine, that is, a machine of which the principles and many of the details of form and construction are illustrated in my Patents 676,277 and 1,028,343 before mentioned, although without intending to limit the invention to that particular machine.

Figure 2:
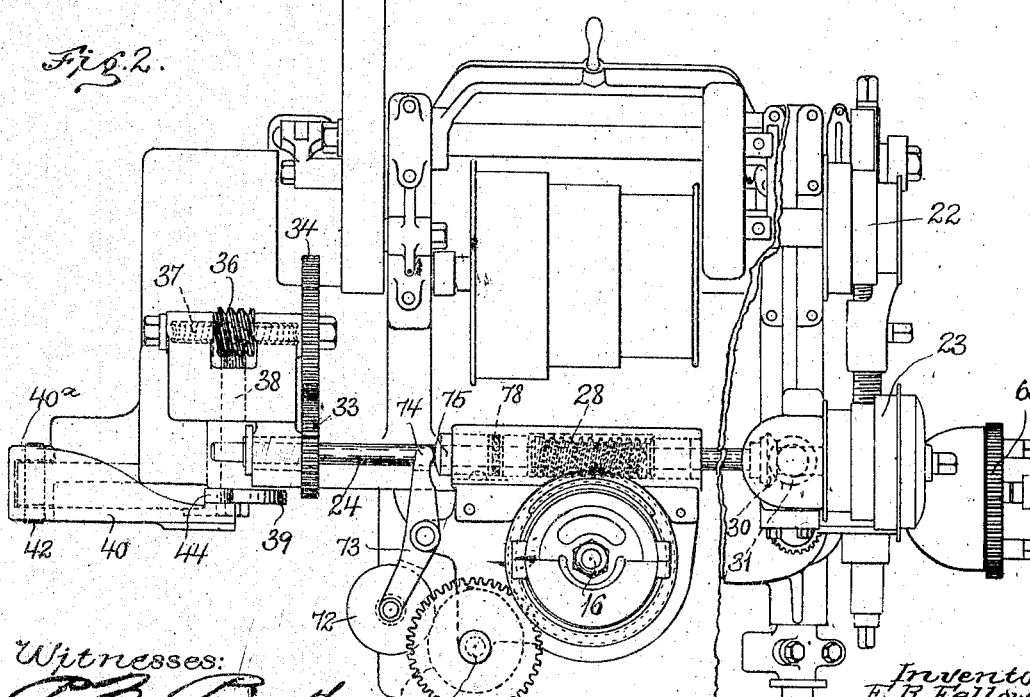

In the accompanying drawings, Figure 1 is a front elevation of so much of my standard machine, with the present improvement applied thereto, as is necessary to enable the present invention to be understood. Fig. 2 is a plan view of the machine with the improvement associated therewith. Fig. 3 is a front elevation on a larger scale of the parts shown in Fig. 1, showing some of the parts in section. Fig. 4 is a plan view of the mechanism in which my present invention is embodied, on a scale larger than Fig. 2. Fig. 5 is an end view as seen from the left of Fig. 4 of this mechanism. Fig. 6 is a horizontal sectional view of the means for varying the rate of indexing the cutter. Fig. 7 is a horizontal sectional view on line 7—7 of Fig. 3. Fig. 8 is a vertical sectional view on line 8—8 of Fig. 3. Fig. 9 is a plan view of the blank of the irregular gear which the particular mechanism herein illustrated is designed to cut, the cutter being shown in operative relation to such blank.

The same reference characters indicate the same parts in all the figures.

Referring first to Figs. 1 and 2, 10 represents the pedestal of the machine, 11 represents the gear blank which is secured to a table 12 carried by a spindle 13, and 14 represents the cutter. Such cutter is formed with projections corresponding in shape to the teeth of a gear, and their lower edges are formed as cutting edges, whereby said cutter may act as a planing tool to remove the material of the gear blank when carried across that portion of the blank in which the teeth are to be formed. On account of the similarity in outline of the projections of the cutter to gear teeth, such projections are usually termed "teeth" in the art, and will be so termed in this description.

The gear blank which is shown in plan view in detail in Fig. 9 is designed to be made into an internal gear of irregular form having four lobes of equal size and symmetrically arranged. The blank therefore has an internal flange 15 of sufficient depth to provide teeth when properly cut away, and this flange has the general outline of the line on which the teeth when cut are arranged. The form and arrangement of the lobes can be clearly determined from Fig. 9. That portion of the lip 15 extending between the points A and B constitutes one of the lobes, occupying ninety degrees of the angular space about the center C of the blank. Evidently the points in each half of each lobe are unequally distant from the center of the gear blank, and in consequence the only way in which a cutter of regular form may be made to generate the teeth of the gear, when the generating movements of the cutter and gear take place about their own respective axes, is to produce a relative movement between the axes of the cutter and gear blank during the course of cutting teeth on each lobe of the blank. A part of my present object has been to provide a means for producing such a change in the relation of these axes, and in the present embodiment of my invention I have provided a means for moving the cutter to secure this relation.

The cutter is mounted upon the lower end of an upright shaft 16 mounted with provision for endwise movement and also rotation in a saddle or slide 17 which is supported on a horizontal guideway 18 in the manner illustrated in my prior patents referred to. The reciprocating endwise movements of the cutter shaft necessary to produce the planing cuts are given by a pinion 19 (Fig. 8), meshing with a rack 20 which is engaged with the cutter shaft 16. Said pinion is secured to a shaft 21 which is oscillated by a transversely moving rack driven by a crank and meshing with a second pinion on the shaft, as fully illustrated and explained in my Patents 676,227 and 1,028,343.

Rotary movements are given to the cutter and work by a cone pulley 22 which drives a pulley 23, the latter pulley being mounted on a shaft 24 and driving the same through a differential gearing, 25, 26 and 27; shaft 24 driving a worm 28 which meshes with a worm wheel 29 properly connected with the cutter shaft 16, and said shaft 24 also driving a beveled gear 30 meshing with a beveled gear 31 on a shaft 32; said shaft 32 driving the work spindle 13 through change gears and a worm and wheel mechanism, all as clearly shown in my Patents 676,227 and 1,028,343, to which reference is directed for a complete description.

The shaft 24 carries a pinion 33 meshing with a gear 34 on a countershaft 35 in rear of shaft 24. Said countershaft also carries a worm 36 in mesh with a worm wheel 37 on a transverse shaft 38. Said shaft 38 carries a cam 39 which oscillates a lever 40, said lever being pivoted at 41 on a portion of the machine frame and having an arm 40$^a$ pivotally connected by a pin 42 with a connecting rod 43. That portion of lever 40 which engages the cam is provided with two anti-friction rolls 44 and 45 engaging the periphery of the cam on opposite sides of the axis thereof, so that the cam positively moves the lever in both directions. The connecting rod 43 is pivoted upon a pin 46 which is connected with a rod 47 being held in jaws 48 projecting from a sleeve 49 which is mounted upon said rod and is secured thereon by a nut 50. The rod 47 has a screw threaded portion 51 on which is mounted a nut 52 (see Fig. 7), such nut being rotatably supported in bearings 53 connected with the saddle 17 which carries the cutter. Nut 52 is provided at one end with a bevel gear 54 which meshes with a bevel gear 55 on a shaft 56 projecting through the front of the saddle and having a square end 57 to be engaged with a wrench or key. The rod 47 is movable endwise in fixed bearings 58 and 59, and is also rotatable, being permitted to turn within the sleeve 49. Such sleeve is confined at one end between a shoulder 60 of the rod and a washer 61 in contact with the nut 50, so that the movements imparted to the sleeve 49 by link 43 are also transmitted to the screw rod, without preventing rotation of the latter at need. The outer end of the screw rod passes through a sleeve or hub 62 forming part of the gear 63, and is engaged with said sleeve by a key 64 which is adapted to slide in a long keyway 65 of the screw rod. Thus when gear 63 is rotated the screw shaft is also rotated, but the screw may move freely endwise with respect to the gear regardless of its rotation.

The gear 63 is driven in any suitable manner, as for instance, in the way the corresponding gears and nuts of my prior patents hereinbefore named are driven, to give the depth feed to the cutter. The depth feed is accomplished in essentially the same way as in my prior patents referred to, with this exception that the screw is rotated in the nut 52, which is connected with the cutter carriage, instead of being prevented from rotating and being moved endwise by a nut.

The present mode of mounting the screw shaft permits the cutter carriage to be moved manually by rotation of shaft 56 up to the position for commencement of the operation, permits the depth feed to be automatically accomplished, and then permits the cutter to be moved back and forth according to the distance of the part of the blank on which it operates from the center of the blank. One revolution of the cam 39 moves the cutter in and out, and the ratio of the gearing through which the shaft 24 drives the cam is proportioned to give such rotation to the cam during the time required for the work piece to rotate through the angle subtended by one of its lobes. In other words the gear train is proportioned so that the ratio of rotation of the cam 39 to the rotation of the cutter spindle is equal to the ratio between the number of teeth on each lobe of the gear and the number of teeth on the cutter. The outline of the cam and the eccentricities of the various points in such outline, are such as to so move the cutter carriage as to maintain the distance between the axis of the cutter and the lip of the gear blank in which teeth are cut exactly the same in all positions of the blank.

Another part of the invention relates to means for varying the rate of generating rotation of the cutter in proportion to the distance of the portion of the blank on which it is acting from the center of the blank. The work holder whereon the gear blank is mounted is rotated uniformly, wherefore those points in the flange 15 which are nearer the center C are not moved so far linearly, with the same angular movement, as are the points in the flange more distant from the center. It is necessary therefore to reduce the rate of generating rotation of the cutter when the latter acts on parts of the lip nearer the center C, and to increase its speed of rotation when it acts on points of the lip more remote from the center, as otherwise the teeth cut in the blank would be unequally spaced. In other words it is of course necessary to cut the teeth in the blank so that such teeth will be conjugate to a gear having its teeth of the same size and pitch as the teeth of the cutter, and so the rate of generating rotation of the cutter must be increased and diminished properly to make the teeth which are cut in the gear of uniform pitch and width. There are several ways in which this variation in the rotation of the cutter might be accomplished. The one which I have chosen to employ in the present case consists in making the worm 28, which rotates the cutter, movable on the shaft 24, and suitably moving the worm so as to augment or diminish the angular movements given by it to the worm wheel 29. The worm 28 is journaled in a bearing 66 connected with the saddle or cutter carriage 17 and is splined on the shaft 24. The worm wheel 29 is connected with the cutter spindle 16 in any desired manner, which I have not particularly illustrated since the mode of connection may be the same as shown in my prior patents referred to. Secured to the worm wheel is a gear 67 which meshes with a second gear 68 which turns upon a stud 69 fixed in a bracket 70 on the side of saddle 17. Connected with gear 68 is a cam 71 which bears on an antifriction roll 72 carried by a lever 73, also pivoted upon a portion of the cutter saddle. Such lever 73 has a forked end 74 which straddles the shaft 24 and bears on the end of a sleeve 75 which is slidably mounted on said shaft and enters one end of the bearing 66. Sleeve 75 is adapted to slide endwise and is prevented from rotating by a key 76 which travels in a slot 77 in the inner side of the bearing. An antifriction thrust bearing 78 is interposed between the sleeve 75 and the end of worm 28. Sleeve 75 is thus the abutment which takes the thrust of worm 28, and permits a retrograde movement of the worm or advances the worm according to the position of the cam 71. It is evident that if the cam is so moved as to withdraw its support from the roll 72, the abutment for the worm is unsupported and therefore the worm imparts to the worm wheel an angular movement less than proportional to its own angular movement; whereas if the cam is moved so as to advance the abutment 75, the worm turns the worm wheel more than in proportion to its angular movement, acting as a rack at that time. As the shaft 24 is in constant rotation, and the surface of the cam is smooth, the shifting back and forth of the worm is continuous and gradual. The rate of rotation of the cam 71 is the same as that of the cam 39, being in the same ratio to the rotation of the cutter as the ratio of the number of teeth on one lobe of the gear to the number of teeth on the cutter.

I have not attempted to describe in detail the operations of the machine in generating and cutting the teeth of a gear, as such operations and the complete details of the mechanisms for carrying them out are fully described in my prior patents already referred to. What I have described here is the means which I have devised for enabling my standard machine to cut irregular gears, such means comprising devices for shifting the cutter toward and from the axis of the work, and for varying the speed of indexing rotation of the cutter, while the work progresses.

While the illustrated embodiment of my invention is an attachment to my standard machine and is designed to cut an internal gear of four lobes, I desire to say that I have not intended this illustration to be a limitation of the invention. External gears as well as internal gears may be cut and so also may gears of more or fewer lobes and having greater or less eccentricity than the lobes of the gear here illustrated, by merely substituting other cams for the cams 39 and 71, such other cams being designed for the particular work in hand. I desire to state also that I have not intended the illustration and description here supplied to be taken as limiting the invention to use in connection with my standard machine. Broadly considered the principles of the present invention are usable with any machine in which gear teeth are generated and cut by the action of a cutter between which and the work there is a movement in one direction to cut the teeth and in another direction to generate the tooth curves, or for indexing to cut a succession of teeth. Consequently it will be seen that I do not necessarily limit the invention to a machine in which the cutter head rather than the work spindle is shifted in accordance with the irregularities of the work, nor to one in which the variation in the rate of generating rotation is applied exclusively to the cutter. For the purposes of this invention and of the following claims any gear is considered irregular if the line in which its teeth are arranged is not equidistant at all points from the axis about which the gear, or a complemental gear in mesh with it, is designed to be rotated, regardless of whether or not the line of teeth is geometrically regular or symmetrical with respect to any diameter of the gear.

The cutter is a formed cutter, each tooth or projection of which is designed and adapted to cut a groove or notch in the tooth-bearing portion of the gear blank; and the relative motions of rotation and translation between the work and cutter, transversely to the direction of cutting movement serve at the same time to index the work and to generate the tooth curves so that the teeth are cut on the desired irregular pitch line.

What I claim and desire to secure by Letters Patent is:—

1. A machine for cutting irregular gears comprising means for supporting a gear blank, a cutter, means for producing relative movements between the cutter and the blank supporting means to cut tooth grooves in a blank supported thereby, and means for shifting one of said elements in such directions transverse to the direction of cutting movement as to cause teeth to be cut in the blank at varying distances from the axis of the blank.

2. A machine for cutting irregular gears comprising means for supporting a gear blank, a cutter having tooth-shaped peripheral projections with cutting edges, arranged on a curved pitch line, and means for simultaneously rotating the cutter and a blank supported by said supporting means about axes so arranged as to cause said cutter to generate teeth in an irregular line in the blank.

3. A machine for cutting irregular gears comprising means for supporting a gear blank, a cutter having tooth-shaped peripheral projections with cutting edges, arranged on a curved pitch line, and means for so rotating the cutter and work holder in unison, and at the same time so shifting the axis of one of them, as to cause the pitch line of the cutter to roll tangent to an irregular pitch line in the work.

4. A machine for cutting irregular gears, comprising means for supporting a gear blank, a cutter having peripheral projections with cutting edges conforming to the outlines of gear teeth arranged on a curved pitch line, and means for rotating the cutter and a blank supported by said supporting means in unison with the same speed at the tangent point of their pitch lines about axes so variable as to the distance between them as to cause said cutter to generate teeth in an irregular line in the blank.

5. A machine for cutting irregular gears, comprising a cutter, a work holder adapted to support a gear blank, means for producing repeated relative cutting movements between the cutter and the work holder across the tooth-bearing lip of a blank supported by said holder, and means for producing such further relative movements between the cutter and work holder as to cause the cutter to produce a series of cuts extending in an irregular line in the tooth-bearing portion of the work.

6. A machine for cutting irregular gears, comprising a cutter, a work holder adapted to support a gear blank, means for producing repeated relative cutting movements between the cutter and the work holder across the tooth-bearing lip of a blank supported by said holder, and means for shifting one of the elements constituted by the cutter and the work holder in such directions transverse to the cutting movements as to cause the cutter to cut teeth in the work at successive points in an irregular line.

7. A machine for cutting irregular gears, comprising a cutting tool constructed to cut notches in the tooth-bearing portion of a gear blank, and means for producing such a combination of relative rotatory and translative movements between said cutter and 17. A machine for producing equally spaced teeth in a gear at points unequally distant from the center of the gear, comprising a cutter having equally spaced tooth-like peripheral projections, a work holder adapted to secure a gear blank in position to be operated on by said cutter, means for reciprocating said cutter across the tooth bearing portion of the gear blank, means for rotating the cutter and work holder simultaneously at a relatively slow speed in proportion to the cutting speed of the cutter, means for moving the cutter toward and from the axis of the gear blank by amounts corresponding to the distances of the teeth on the gear from the center, and means for proportionately diminishing and increasing the rate of rotation of the cutter relatively to the rate of rotation of the work holder.

18. In a gear cutting machine in which a gear shaped planing cutter and a work holder are rotated simultaneously, and one of said members is moved relatively to the other in a direction to cause cuts to be made in the tooth-bearing part of the gear blank carried by the work holder, a driving shaft, and mechanism operated by said shaft for increasing and diminishing, by gradual and predetermined amounts, the distance between the axes of the cutter and work holder.

19. In a gear cutting machine in which a gear shaped planing cutter and a work holder are rotated simultaneously, and one of said members is moved relatively to the other in a direction to cause cuts to be made in the tooth-bearing part of the gear blank carried by the work holder, automatic means for producing graduated and predetermined alterations in the distance between the axes of the cutter and work holder, and means for proportionately increasing and diminishing the rate of rotation of one of the members, consisting of the cutter and work holder, relatively to the other member.

20. A gear cutting machine including a cutter carriage, a cutter mounted upon said carriage and movable both axially and rotatably, a rotary work holder, a main driving mechanism, and means driven by said mechanism for moving the cutter carriage by predeterminined relatively minute amounts successively toward and away from the axis of the work holder.

21. A gear cutting machine including a cutter carriage, a cutter mounted upon said carriage and movable both axially and rotatably, a rotary work holder, and mechanism for automatically moving the cutter carriage by predetermined relatively minute amounts toward and away from the axis of the work holder, means for rotating the cutter and work holder simultaneously, and means for relatively increasing and diminishing the rate of rotation of the cutter.

22. In a machine of the character described, a cutter carriage, a cutter mounted on said carriage to move rotatably about an axis and longitudinally of such axis, the carriage itself being bodily movable transversely of such axis, a screw rod engaged with said carriage extending in the direction in which said carriage is movable, and mechanism for moving said rod alternately back and forth by graduated successive differences of movement.

23. In a machine of the character described, a cutter carriage, a cutter mounted on said carriage to move rotatably about an axis and longitudinally of such axis, the carriage itself being bodily movable transversely of such axis, a screw rod engaged with said carriage extending in the direction in which said carriage is movable, means for actuating said screw rod to give a regulated depth feed to the carriage, and means independent of said depth feed mechanism for moving said rod and therewith the carriage back and forth by predetermined regulated differences of movement.

24. In a gear generating machine adapted to cut irregular gears in combination with a rotatable and axially movable gear shaped planing cutter and a rotatable work holder adapted to support a gear blank, means for shifting said cutter toward and from the axis of the blank in accordance with the eccentricity of the teeth to be cut in the gear, and means for reducing the rate of rotation of the cutter relatively to the rotation of the work holder in proportion to the approach of the cutter toward the axis of the work holder.

25. In a gear cutting machine of the character indicated a cutter carriage, an endwise movable rod engaged with said carriage, a cutter mounted upon said carriage, mechanism for driving said cutter axially and rotatably, a cam driven by said mechanism, and connections operated by said cam for moving said rod and therewith the carriage back and forth.

26. In a machine of the character described adapted to cut irregular gears, a work holder adapted to support a gear blank, a cutter carriage mounted to move transversely of the axes of said holder and blank, a gear shaped planing cutter mounted reciprocably and rotatably on said carriage, a rotatably mounted cam having points on its cam surface eccentric to the axis of rotation in proportion to the eccentricity of points in one lobe of the gear blank, common mechanism for actuating the cutter and rotating said cam, and means by which said cam shifts said cutter carriage proportionately to the varying eccentricity of the cam.

27. In a machine of the character described, a gear shaped planing cutter adapta gear blank as to cause the cutter to act on the blank at a succession of points in an irregular line.

8. A machine for cutting irregular gears, comprising a gear blank holder, a rotatory cutter having projections similar in outline and arrangement to gear teeth, means for producing such movement between the cutter and the holder as to cause the projections of the cutter to make grooves in a blank carried by the holder, means for rotating the cutter and gear blank in unison, and means for progressively increasing and diminishing the distance between the axes of the cutter and blank in the course of cutting a single gear.

9. A machine for cutting irregular gears, comprising a gear blank holder, a rotatory cutter having projections similar in outline and arrangement to gear teeth, means for producing such movement between the cutter and the holder as to cause the projections of the cutter to make grooves in a blank carried by the holder, means for rotating the cutter and gear blank in unison, and means for gradually altering the distance between the axes of the cutter and blank by amounts and in directions according to the distances of successive points in the irregular pitch line of the teeth being cut from the axis of the blank.

10. A machine for cutting irregular gears, comprising a gear blank holder, a rotatory cutter having projections similar in outline and arrangement to gear teeth, means for producing such movement between the cutter and the holder as to cause the projections of the cutter to make grooves in a blank carried by the holder, means for rotating the cutter and gear blank in unison, and means for moving the cutter progressively toward and away from the axis of the blank during the cutting operations.

11. A machine for generating and cutting the teeth of irregular gears, comprising a gear blank holder and a gear-shaped planing cutter arranged to rotate about approximately parallel axes, means for producing relative movement between said cutter and holder in the general direction of such axes, means for rotating said cutter and holder simultaneously about their axes in the manner of intermeshing gears, and means for so shifting the cutter as to increase and diminish the distance of its axis from that of the holder by amounts corresponding to differences between the distances of different points in an irregular tooth-bearing portion of a gear blank from the axis of the blank, whereby to cause teeth to be cut in an irregular line in such blank.

12. A gear generating and cutting machine including in combination with a gear shaped planing cutter, a work support, means for producing relative cutting movements between the cutter and work, and means for varying the rate of rotary movement of the cutter relatively to the work support.

13. A gear generating and cutting machine including in combination with a gear shaped planing cutter, a work support, means for producing relative cutting movements between the cutter and work, means for rotating the cutter and work, mechanism for effecting a graduated and predetermined variation in the relation between the axes of the cutter and of the work piece, and means for varying the rate of rotation of the cutter in proportion to the distance between said axes.

14. A machine for generating and cutting teeth in irregular gears, comprising in combination a gear-shaped planing cutter, a work holder adapted to support a gear blank, means for producing movements between said cutter and work holder to cause cuts to be taken across the tooth-bearing part of the gear blank, mechanism for giving generating rotatory movements to the cutter and work holder in unison, and means for gradually increasing and reducing the distance between the axes of the cutter and work holder by distances cumulatively equal to the differences in distances of successive tooth locations in an irregular gear blank from the axis of the blank.

15. A machine for producing equally spaced teeth in a gear at points unequally distant from the center of the gear, comprising a cutter having equally spaced tooth-like peripheral projections, a work holder adapted to secure a gear blank in position to be operated on by said cutter, means for reciprocating said cutter across the tooth bearing portion of the gear blank, means for rotating the cutter and work holder simultaneously at a relatively slow speed in proportion to the cutting speed of the cutter, and means for moving the cutter progressively toward and away from the axis of the gear blank in the progress of cutting the teeth on a single blank.

16. A machine for producing equally spaced teeth in a gear at points unequally distant from the center of the gear, comprising a cutter having equally spaced tooth-like peripheral projections, a work holder adapted to secure a gear blank in position to be operated on by said cutter, means for reciprocating said cutter across the tooth bearing portion of the gear blank, means for rotating the cutter and work holder simultaneously at a relatively slow speed in proportion to the cutting speed of the cutter, and means for gradually shifting the cutter toward and away from the axis of the work holder by amounts equal to the differences in the distances of adjacent teeth of the gear from the center of the gear.

ed to rotate about its center, a worm wheel connected to the spindle of said cutter, a worm meshing with said wheel, a shaft for rotating said worm in respect to which the worm is freely movable endwise, an end thrust bearing for the worm, and means for shifting said end thrust bearing, whereby the worm may be moved endwise to impart a greater or less movement to the worm wheel than that proportional to the rotation of the worm.

28. In a machine of the character described, including a gear shaped planing cutter adapted to rotate about its axis, a work holder adapted also to rotate about its axis, and mechanism for rotating said cutter and work holder in unison, a worm and wheel gear constituting part of such mechanism and a shaft with which such worm is non-rotatably engaged and is movable endwise, an end thrust abutment for said worm, and means for shifting the position of said abutment by predetermined amounts.

29. In a gear cutting machine adapted to cut irregular gears, in combination with a gear shaped planing cutter, an automatic mechanism for shifting said cutter bodily and a means for rotating said cutter with a graduated increase and decrease in its rate of rotation.

30. In a gear cutting machine the combination with a gear shaped planing cutter, of a work holder, means for rotating said cutter and work holder in unison, means for changing the distance between the axes of the cutter and work holder, and means for causing a variation in the rate of rotation of the cutter.

31. In a gear cutting machine including a rotatably mounted gear shaped planing cutter, a work support, mechanism for producing such relative movements between the cutter and support as to cause the cutter to cross the tooth bearing part of a blank held by said support and to cut grooves therein, means for simultaneously rotating the cutter and blank to generate the tooth curves in the teeth being cut and at the same time to change the distance between the axes of the cutter and work support to cause the teeth to be cut in an irregular line, and means for effecting a change in the rate of rotation of the cutter proportional to the change in the difference between such axes.

32. In a machine of the character described, a cutter carriage, a cutter spindle rotatably mounted in said carriage, a worm wheel connected to said spindle, a worm meshing with said wheel, a shaft splined to said worm on which the latter is movable endwise, a movable end thrust bearing for said worm, an abutment for such bearing, a cam arranged to take the thrust of said abutment, and gearing driven by said worm wheel for rotating said cam.

33. In a machine of the character described, a cutter carriage, a cutter spindle rotatably mounted in said carriage, a worm wheel connected to said spindle, a worm meshing with said wheel, a shaft splined to said worm on which the latter is movable endwise, a movable end thrust bearing for said worm, an abutment for such bearing, a cam arranged to take the thrust of said abutment, and gearing driven by said worm wheel for rotating said cam.

34. In a gear cutting machine, a cutter carriage mounted movably, a cutter spindle mounted transversely to the direction of movement of said carriage and rotatably mounted in the carriage, a drive shaft, a cam, speed reducing gear by which said drive shaft rotates said cam, and connections from the cam to said carriage and arranged to shift said carriage.

In testimony whereof I have affixed my signature, in presence of two witnesses.

EDWIN R. FELLOWS.

Witnesses:
E. W. MILLER,
R. M. FELLOWS.